June 11, 1940.  O. A. KEHLE  2,204,017
FILTER
Filed March 3, 1939
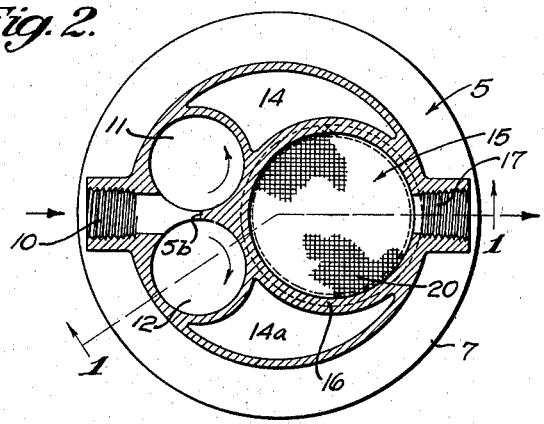
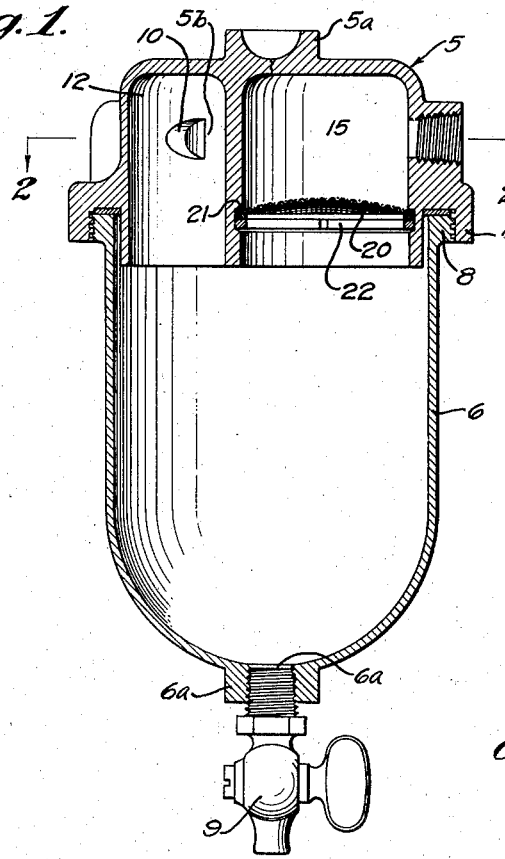
Inventor
Ottmar A. Kehle.
Attorney.

Patented June 11, 1940

2,204,017

UNITED STATES PATENT OFFICE 2,204,017

FILTER

Ottmar A. Kehle, West Los Angeles, Calif., assignor to Sterling Products Company, Los Angeles County, Calif., a corporation of California Application March 3, 1939, Serial No. 259,564

8 Claims. (Cl. 183—67)

My invention has to do with filters and, more particularly, relates to filters of the baffle type. One of the chief uses of such devices is for interposition in air lines to remove any moisture or foreign matter before the air stream reaches the tool or machine which it is to operate.

While of course filters using baffles for separating moisture and foreign matter from air lines are well known in the art, I have found those filters of the prior art to possess certain rather serious shortcomings which have materially reduced their efficiency. For instance, for the most part prior art filters lack means for insuring that the precipitation of the moisture from the air line will take place at the most desirable point and they lack design and structure which will afford the greatest filtering efficiency commensurate with the relative size of the filter device. Another fault I have found is that, due to their design and association of parts, even after the moisture is precipitated out of the air stream, an objectionable amount of it is again picked up and carried out of the filter in the stream. I have discovered improvements whereby these and other faults are effectively cured.

For instance, one of the aims accomplished by my new filter is the provision of simple means for directing and controlling the air stream so that maximum precipitation will be effected.

Another aim and accomplishment is my novel means and combination whereby the moisture or foreign matter is precipitated out of the air stream at a point in the device at which it will not be again picked up and carried out by the departing air stream.

Another aim and accomplishment is the provision of a filter which may be of relatively small size in relation to its filtering capacity and efficiency.

Another feature of my invention is the provision of a filter utilizing parts which have certain critical relationships to other parts with reference to size, which critical relationships form a part of my discovery.

Still another object and aim is the provision of a filter which, due to its simplicity and design, may be economically manufactured and which is extremely easy to disassemble for cleaning purposes.

Although I have specifically recited some of the principal objects, it will be apparent from the following description that other objects and accomplishments are inherent in my invention.

For the purposes of said description, I shall refer to the accompanying drawing, in which:

Fig. 1 is a vertical section taken on line 1—1 of Fig. 2; and

Fig. 2 is a section on line 2—2 of Fig. 1.

Generally speaking, the foregoing and other aims are accomplished by a device comprising a receptacle and a head portion thereon. The air entering the head is conducted into a baffle tube or tubes through which the air is spirally delivered into the receptacle in a stream or streams which do not reach their maximum expansion until they approach the bottom of the receptacle. The inlet is at one side of the head and the outlet is at the opposite side of the head, and the baffle tube or tubes open into the relatively larger receptacle at a point adjacent one side of the receptacle so that the moisture or foreign matter centrifugally precipitated from the stream is deposited at a point relatively removed from the outlet. The receptacle should be of substantially larger cross-sectional area than that of the baffle tube for greater efficiency and also each baffle tube should open into the receptacle in such relative position that its axial plane is substantially perpendicular to the bottom wall of the receptacle.

I shall now describe a preferred embodiment of my invention, from which the significance of each of those features of construction and combination, as well as other advantages flowing from my invention, will become obvious to those skilled in the art.

Referring to the drawing, it will be observed that my filter comprises a head 5, preferably of cast metal, which has a bottom, internally threaded, annular flange portion 7, by virtue of which the head is screwed onto the annular threaded portion 8 of receptacle 6 so that the head has fluid tight engagement with the receptacle. Receptacle 6 is preferably circular in cross-section, having a vertically disposed side wall and a bottom wall which tapers to a drain port 6a into which is screwthreaded a drain cock 9 of conventional form. Head 5 and receptacle 6 are each provided with a polygonal boss 5a, 6b, respectively, for engagement by a wrench to facilitate removing the head from the receptacle.

Head 5 has an inlet port 10 leading from an air line, not shown, and the air stream entering therethrough is divided by barrier 5b so that it is discharged equally into two parallel, vertically disposed baffle tubes 11 and 12 in the head. Parallel to tubes 11 and 12 there is an outlet chamber 15 which is formed by the tubular wall portions 16 of the head, and has an outlet port 17 leading from chamber 15 to the air line. Ports 10 and 17 are threaded to receive suitable connecting pipes. Adjacent the lower end of chamber 15 there is a screen 20 which is mounted by being held against shoulder 21 by a split spring ring 22, partly shown in elevation in Fig. 1. Recesses 14 and 14a are provided in the head adjacent the tubes 11, 12 and 16, said recesses 14 and 14a opening into the receptacle 6.

Having described the componental elements and arrangements of my device, I will now explain its operation. As the moisture-laden air stream enters through inlet port 10, it will be separated by barrier 5a and will thus enter the said tubes 11 and 12 substantially tangential and will be directed spirally downwardly through the open end of the tubes 11 and 12 into the relatively larger receptacle 6, at which point the velocity is substantially reduced by virtue of the relatively larger cross-sectional area of the receptacle. The spiral movement of the air streams causes the moisture to be precipitated out by the resultant centrifugal action and the moisture thus thrown against tube walls 11, 12 and the inner wall of the receptacle, will drain or be thrown to the bottom of the receptacle where it may be removed through drain cock 9. Thence the air stream will travel along the opposite wall of the receptacle and outwardly through screen 20 into chamber 15, from whence it passes through restricted outlet 17 into the air line, not shown.

For efficient operation, I have found that the receptacle should have a minimum size with respect to the cross-sectional area of the baffle tubes. For instance, I have found that the cross-sectional area of the receptacle should be at least three times the cross-sectional area of each baffle tube, to permit suitable expansion and consequent reduction in velocity of the air stream and insure the precipitation taking place at one side of the receptacle—that side opposite the outlet. My device has been designed to take advantage of those discoveries. Also, in my device, the air stream enters and leaves the receptacle in a direction perpendicular to the plane of the level of the settled water in the receptacle. I have found this to be an advantageous feature in that there is less tendency for the air stream to pick up and carry away any of the moisture or foreign matter already deposited.

In operation, any normal amount of moisture carried in the air stream entering the filter will be precipitated out within the tubes 11 and 12 and within that portion of the receptacle under the tubes, so that the air stream will be substantially free of moisture as it approaches the point at which the outlet communicates with the receptacle. Inasmuch as the open area of the outlet from the receptacle to the head is materially restricted by the screen 20, there will be a second expansion in the outlet chamber 15 above the screen which will cause any moisture or matter which might still be carried by the air stream to be deposited in chamber 15. The baffle tubes 11 and 12 should be sufficiently long in proportion to their diameter as to spiral the air stream downwardly into the receptacle at a velocity which is capable of centrifugally precipitating the moisture from the air stream. For instance, I have found it desirable to have each of the baffle tubes about 1¾" in diameter and about 1¾" in length.

Thus by virtue of those elongated tubular baffles the air is directed into the receptacle in two parallel, spiral streams, and the maximum spread of those air streams is not reached until they approach the bottom of the receptacle, so that little or no moisture is deposited immediately adjacent the outlet. Thus my improved device will function efficiently even at relatively high velocity.

Any moisture thrown against the walls of tubes 11 and 12 will move to and form in drops around the periphery of the outlet end of tubes 11 and 12 and will thus drop or be carried by the air stream to the bottom of the receptacle without falling into and being carried out by the outgoing air.

By virtue of the baffle tubes opening into the receptacle adjacent one of its sides, and the outlet communicating with the receptacle adjacent the opposite side, and by virtue of the air stream being directed downwardly towards the bottom of this receptacle, all combined with the receptacle having a substantially larger cross-sectional area than that of each of the baffle tubes, I find that there is always a relatively dry area at and adjacent the outlet from the receptacle to the chamber 15.

While in the foregoing description I have resorted to considerable detail of use, structure and arrangement, it will be understood that my invention is not to be necessarily confined to such details but that it may be modified and used within the scope of the appended claims.

I claim:

1. A separator comprising a fluid receptacle, a head mounted thereon, an elongated baffle tube in the head, said tube having one of its ends opening into the receptacle and being disposed longitudinally in the head adjacent the periphery thereof, an inlet passage in the head communicating tangentially with said tube at a point adjacent the other end thereof, and an outlet passage in the head, said passage communicating with the receptacle at a point laterally spaced from the point at which said tube opens into the receptacle.

2. A separator comprising a fluid receptacle, said receptacle being round in cross-section, a head mounted on the receptacle, a pair of parallel baffle tubes in the head, each of said tubes being closed at one end and having its other end communicating with the receptacle adjacent one side thereof, an inlet port intersecting both said baffle tubes at a point adjacent the closed end thereof, and an outlet passage in the head, said outlet passage communicating with the receptacle at a point laterally spaced from the point at which the baffle tubes communicate with the receptacle.

3. A separator comprising a fluid receptacle, said receptacle being round in cross-section, a head mounted on the receptacle, a pair of parallel, elongated baffle tubes mounted longitudinally in the head, each of said tubes being closed at one end and having its other end communicating with the receptacle adjacent one side thereof, an outlet chamber in the head, said chamber being parallel to said baffle tubes and communicating at one end with the receptacle at a point diametrically spaced from said baffle tubes, a screen mounted in that end of the chamber which communicates with the receptacle, and a restricted outlet port in the head providing communication from the said chamber to the air line.

4. A separator comprising a fluid receptacle, a head mounted thereon, a pair of baffle tubes in the head, each of said tubes being closed at its top end and opening at its bottom end into the receptacle, said tubes being positioned parallel to and closely adjacent each other, an inlet passage communicating at one end with said air line and at its other end intersecting said tubes at a point adjacent the top end thereof, a barrier in the head between the tubes at said point of intersection, said barrier being opposite the axis of the inlet passage and formed by the walls of said tubes whereby the air will be thereby divided and directed into the tubes in substantially equal quantities, and an outlet passage in the head and communicating with the receptacle.

5. A separator for interposition in an air line including: a vertically disposed fluid receptacle having an open top end and a bottom end which tapers downwardly and inwardly to its center, a drain port in the center of said bottom portion, a head removably mounted on the open end of the receptacle, a pair of parallel, elongated, vertically disposed baffle tubes in the head, each of said tubes being closed at its upper end and opening at its other end into the receptacle at a point adjacent the side wall thereof, an air inlet opening in the head intersecting said tubes at a point adjacent the closed end thereof, barrier means on the tubes opposite said point of intersection for dividing the air stream and directing same into said tubes, an outlet chamber in the head parallel to said tubes, said chamber communicating with the receptacle at a point spaced from the point at which said baffle tubes open into the receptacle, and an outlet port in the head communicating at one end with said chamber and at its other end with the air line.

6. A separator comprising a body having a head portion and a receptacle portion, a pair of parallel cylindric baffle tubes in the head and opening into the receptacle, an inlet in the head and communicating with the baffle tube, said inlet being disposed tangentially of the tubes and opening into one of the tubes at one side thereof and opening into the other tube at the adjacent side thereof whereby fluid discharged from the inlet into said tubes is caused to swirl in opposite directions, and an outlet passage leading from said receptacle.

7. A separator comprising a fluid receptacle having a substantially vertical axis, a head on and forming a closure for the receptacle, a baffle tube in the head and disposed in a plane parallel to the said axis of the receptacle, said tube being closed at its top end and opening at its other end into the receptacle at a point adjacent a side wall thereof and spaced a substantial distance above the bottom of the receptacle, a fluid inlet in the head and opening substantially tangentially into the tube at a point adjacent the top end thereof, and an outlet from the receptacle, said outlet communicating with the receptacle at a point laterally spaced from the point at which the baffle tube opens into the receptacle.

8. The device of claim 7 in which the interior of the receptacle is unobstructed and of a cross-sectional area substantially greater than that of the baffle tube so as to permit free expansion and movement of a fluid stream within the receptacle.

OTTMAR A. KEHLE.

CERTIFICATE OF CORRECTION.

Patent No. 2,204,017.

June 11, 1940.

OTTMAR A. KEHLE.

It is hereby certified that error appears in the printed specification of the above numbered patent requiring correction as follows: Page 2, first column, line 72, for "tubes about 1 3/4''" read --tubes about 1 1/4''--; and that the said Letters Patent should be read with this correction therein that the same may conform to the record of the case in the Patent Office.

Signed and sealed this 27th day of August, A. D. 1940.

Henry Van Arsdale,
Acting Commissioner of Patents.

(Seal)